INVENTORS
JOHN P. CRAIN
BY ALBERT CRAIN
Kimmel & Crowell
ATTORNEYS.

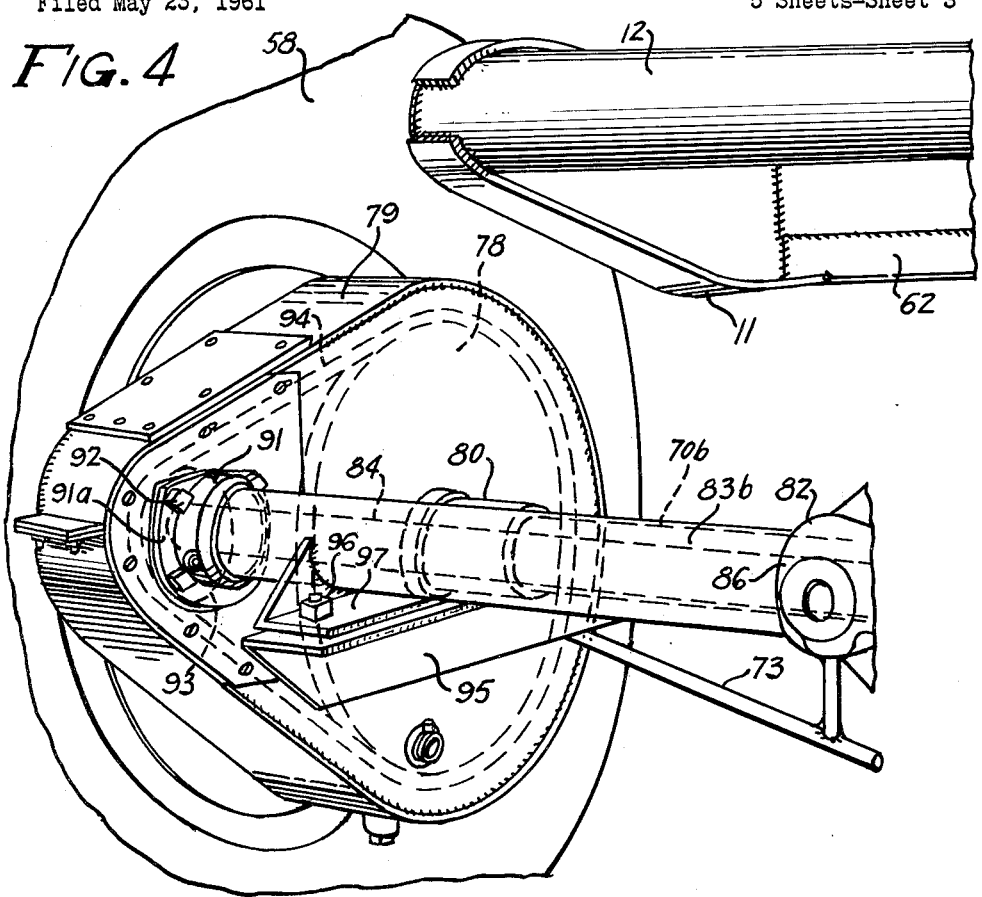
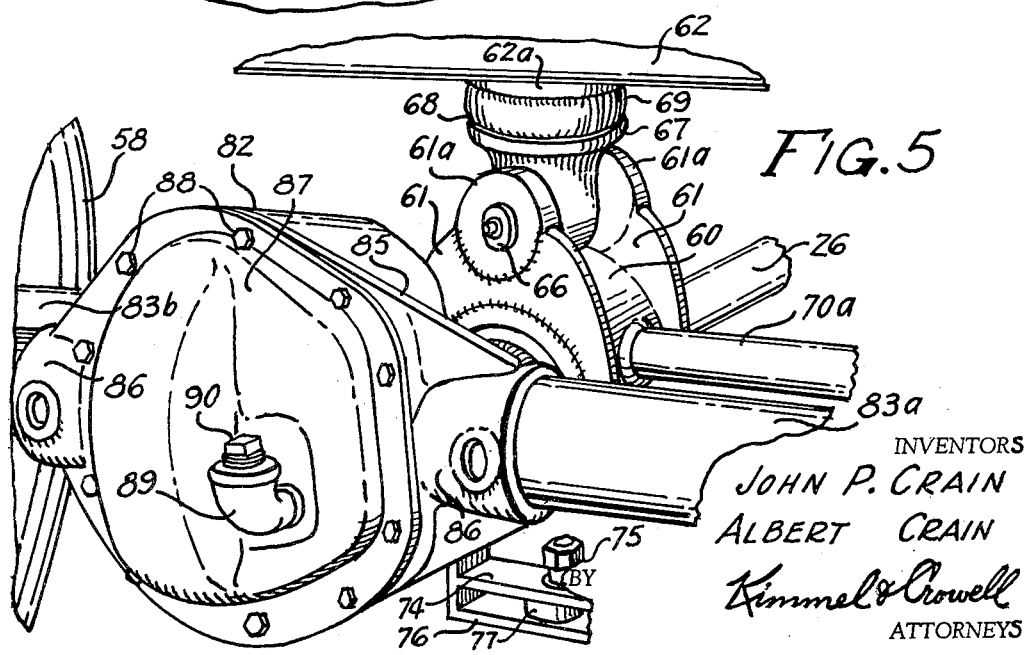

Aug. 7, 1962 J. P. CRAIN ET AL 3,048,233
MARSH BUGGY
Filed May 23, 1961 5 Sheets-Sheet 4
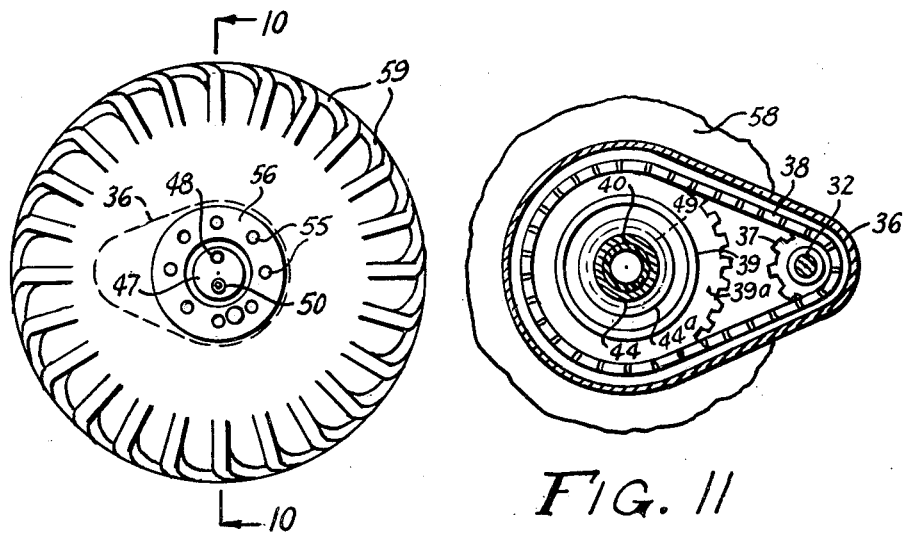
FIG. 9
FIG. 11
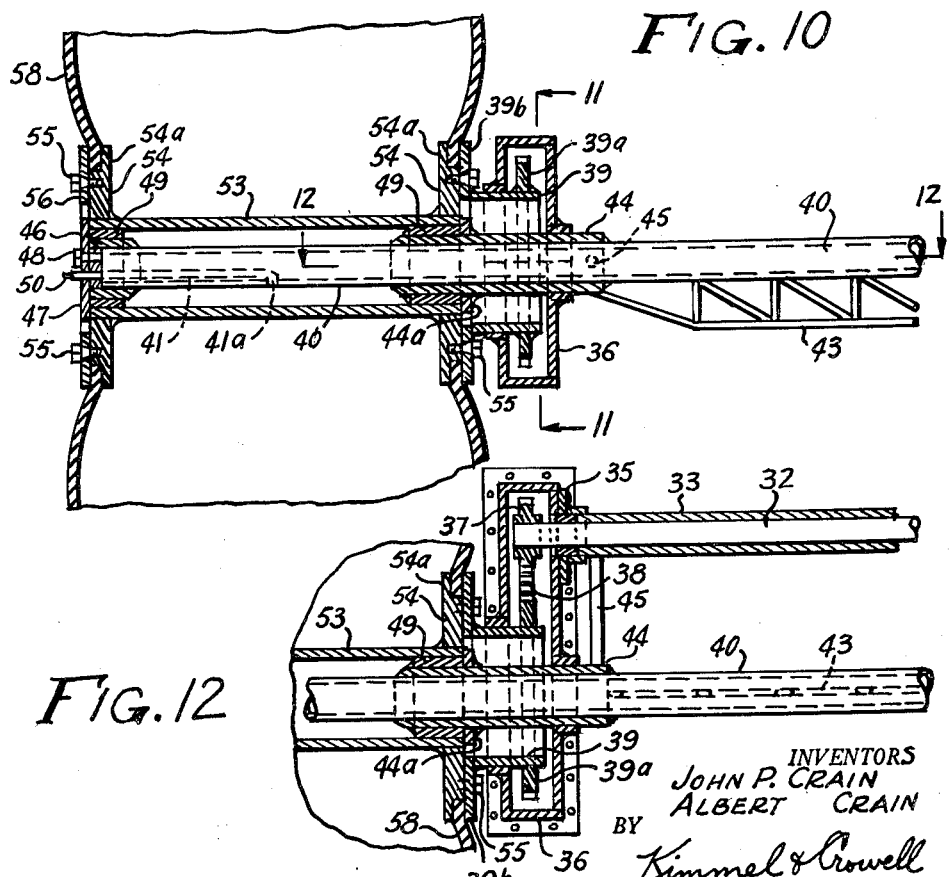
FIG. 10
FIG. 12
INVENTORS
JOHN P. CRAIN
ALBERT CRAIN
BY Kimmel & Crowell
ATTORNEYS.

Aug. 7, 1962   J. P. CRAIN ET AL   3,048,233
MARSH BUGGY
Filed May 23, 1961   5 Sheets-Sheet 5

INVENTORS
JOHN P. CRAIN
ALBERT CRAIN
BY
Kimmel & Crowell
ATTORNEYS.

United States Patent Office 3,048,233
Patented Aug. 7, 1962

3,048,233
MARSH BUGGY
John P. Crain and Albert Crain, both % General Delivery,
Grand Chenier, La.
Filed May 23, 1961, Ser. No. 112,091
1 Claim. (Cl. 180—49)

This invention relates to a marsh buggy, and constitutes an improvement over the prior patent issued to John P. Crain, No. 2,560,384 dated July 10, 1951.

A primary object of the invention is the provision of an improved marsh buggy characterized by large inflated rubber tires with inverted V cleats thereon, the tires and their associated wheels being interchangeable for metal wheels of the type disclosed in the prior patent above referred to, as desired.

An additional object of the invention is the provision of such a marsh buggy having a steel bed mounted directly on an elevated frame, the frame being raised to permit the buggy to be employed over rough terrain.

A further object of the invention resides in the positioning of the drive shaft through the carrier axle, instead of beneath the same as has hitherto been done.

An additional object of the invention resides in the provision of means for imparting power steering to the wheels of the marsh buggy.

Still another object of the invention resides in the provision of an improved and simplified marsh buggy characterized by chain drive means, the chains being enclosed in appropriate housings to protect the same.

Still other objects reside in the combinations of elements, arrangements of parts, and features of construction, all as will be more fully pointed out hereinafter and shown in the accompanying drawings wherein:

FIGURE 3 is a fragmentary enlarged perspective view taken substantially along the line 3—3 of FIG. 1.

FIGURE 4 is a fragmentary enlarged perspective view taken substantially along the line 4—4 of FIG. 2 as viewed in the direction indicated by the arrows.

FIGURE 5 is an additional enlarged perspective view taken substantially along the line 5—5 of FIG. 2 as viewed in the direction indicated by the arrows.

FIGURE 9 is a side elevation view of one of the rear wheels of the marsh buggy;

FIGURE 10 is a vertical elevational view, taken on the section line 10—10 of FIGURE 9 and looking in the direction of the arrows, showing the mounting for the rear wheels;

FIGURE 11 is a vertical sectional view, taken on the section line 11—11 of FIGURE 10 and looking in the direction of the arrows, showing the chain drive for the rear wheels;

FIGURE 12 is a horizontal sectional view, taken on the section line 12—12 of FIG. 10 in the direction of the arrows, showing the drive and also partly showing the mounting for the rear wheels;

Figure 13:
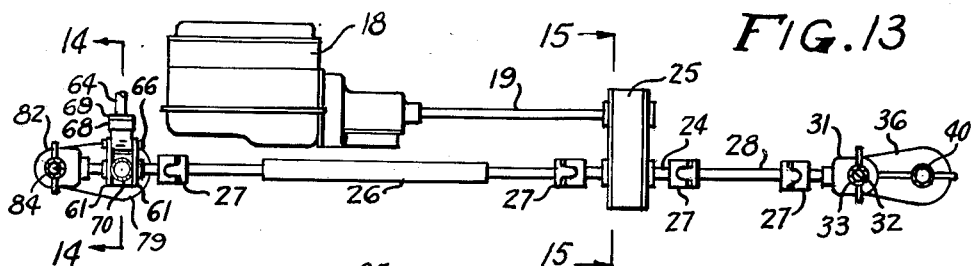
FIGURE 13 is a side elevation view, showing the drive between the propelling engine for the marsh buggy and the front and rear wheels.
Figure 14:
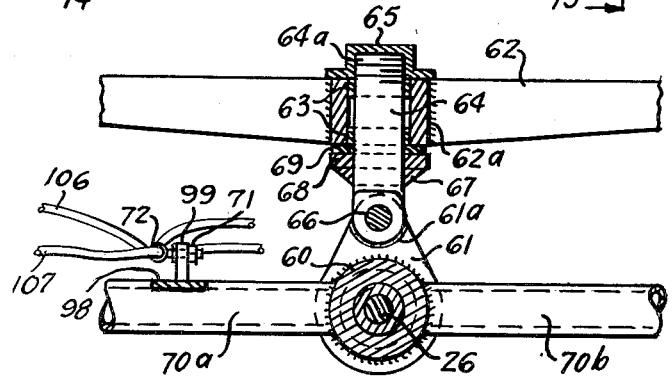
FIGURE 14 is a vertical sectional view taken on the section line 14—14 of FIGURE 13 and looking in the direction of the arrows, showing the support for the differential for the front wheels.
Figures 15, 16:
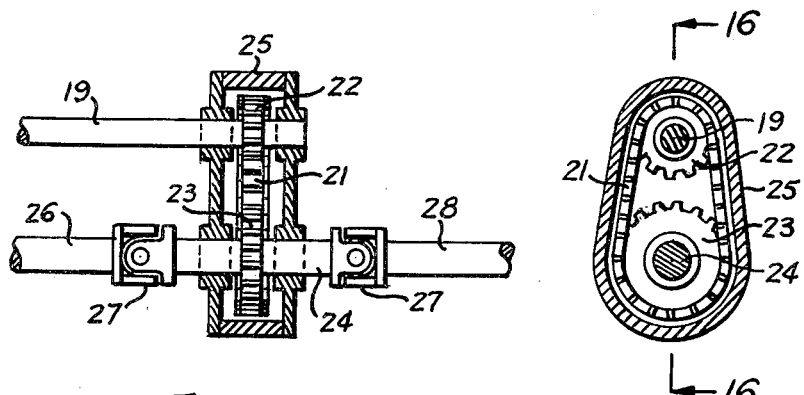

FIGURE 15 is a vertical sectional view, taken on the section line 15—15 of FIGURE 13 and looking in the direction of the arrows, showing the chain gear reduction drive between the internal combustion engine transmission shaft and the longitudinally positioned propeller shafts to the differentials for the front and rear wheels; and, FIGURE 16 is a vertical sectional view, taken on the section line 16—16 of FIGURE 15 and looking in the direction of the arrows.

Similar reference characters refer to similar parts throughout the several views of the drawing.

Figure 2:
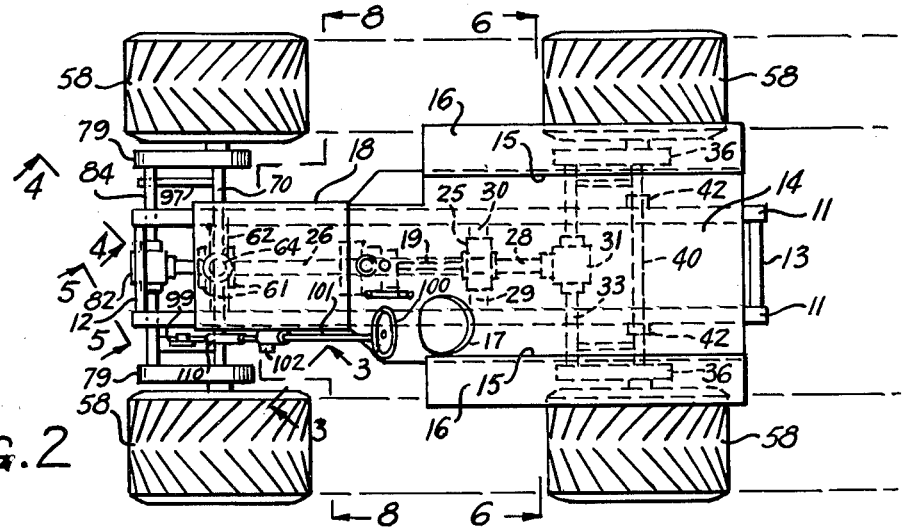
FIGURE 2 is a top plan view of the marsh buggy of FIGURE 1, certain concealed parts being shown in dotted lines.

Having reference now to the drawings in detail, the swamp buggy of the instant invention is generally indicated at 10, and comprises a frame which includes a pair of longitudinally extending frame members 11 which are connected at their front and rear extremities by transverse bars or rods 12 and 13, respectively. The frame members 11 carry a steel truck type body 14, including side walls 15 and upper horizontal flanges 16 (see FIGS. 2 and 6), the body being provided with an operator's seat 17, and carrying adjacent its front end a conventional internal combustion engine generally indicated at 18.

As shown particularly in FIGURE 13, the internal combustion engine has the usual transmission and a transmission shaft 19. The marsh buggy has front and rear longitudinally positioned propeller shafts 26 and 28. These shafts are mounted beneath the frame by suitable supporting members 29 and 30, respectively. For driving the propeller shafts 26 and 28 there is provided a chain reduction gearing. This gearing is comprised by a chain sprocket 22, a chain 21 trained over the chain sprocket 22, and a chain gear 23 mounted on a driven shaft 24, and all enclosed by a suitable gear casing 25. This driven shaft 24 is drivably connected to the front and rear longitudinally positioned propeller shafts 26 and 28 by universal joints 27—27. The front propeller shaft 26 consists of longitudinally, telescopically, and drivingly related sections of the type shown in my prior patent referred to above and in the United States patent to Timberlake, No. 1,294,198.

Figure 1:
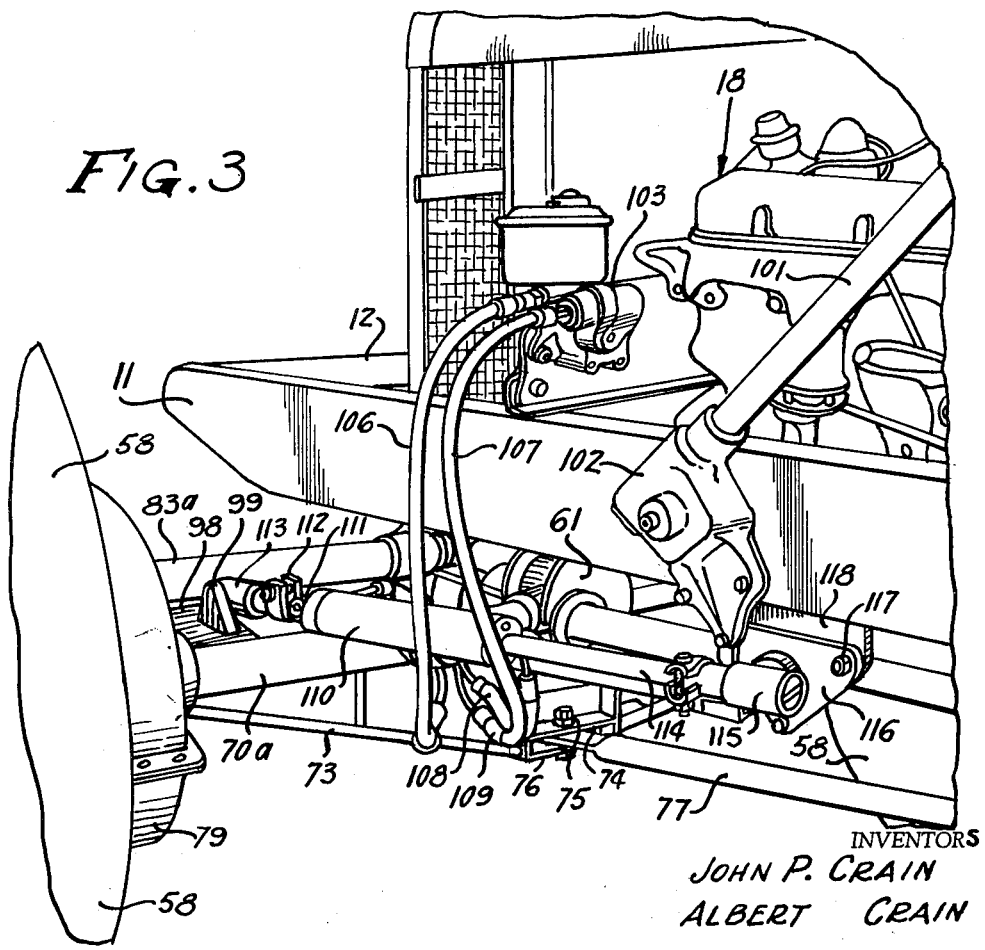
FIGURE 1 is a perspective view of one form of marsh buggy embodying elements of the instant invention.
Figures 6, 7:
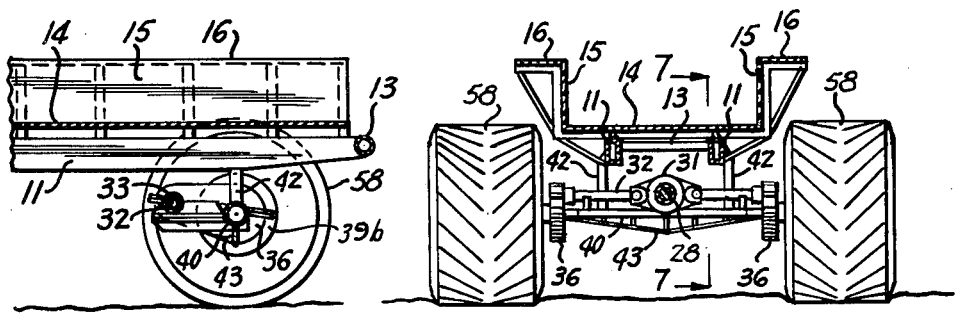
FIGURE 6 is a sectional view taken substantially along the line 6—6 of FIG. 2 as viewed in the direction indicated by the arrows.
FIGURE 7 is a sectional view taken substantially along the line 7—7 of FIG. 6 as viewed in the direction indicated by the arrows.
Figure 8:
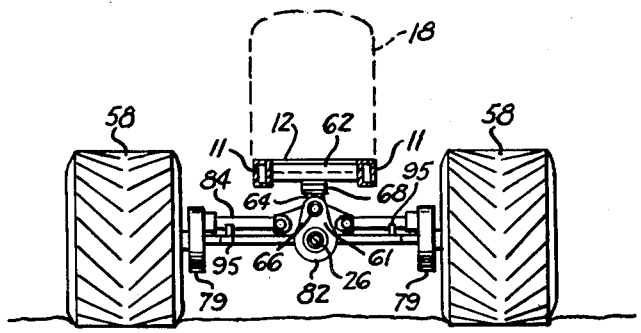
FIGURE 8 is a sectional view taken substantially along the line 8—8 of FIG. 2 as viewed in the direction indicated by the arrows, parts thereof being omitted.

The rear propeller shaft 28 is drivably connected by another universal joint 27 to a rear differential 31, through which there extends a transversely positioned rear drive shaft 32. This latter shaft is enclosed by a tubular housing 33 which, as shown in FIGURE 1, is secured to the longitudinally positioned frame members 11—11 by diagonally positioned supporting members 34—34. Referring now to FIGURE 12, it will be seen that the tubular housing 33 is secured at one end in the inner side wall of a gear casing 36 by a flanged bushing 35. There are two of these gear casings 36, positioned on the opposite sides of the frame, as shown in FIGURE 6, and it will be understood that the tubular housing 33 is likewise secured at its opposite end into the side wall of the second gear casing 36 by a similar flanged bushing 35. At its outer ends the rear drive shaft 32 carries chain sprockets 37, which are positioned within the gear casings 36. Chains 38 are trained over the chain sprockets 37 and over chain gears 39a, which are integrally formed on hubs 39 and which hubs also have bottom flanges 39b thereon.

A transversely positioned rear carrier axle 40 is located rearwardly of, in parallel relationship to, and in a slightly lower horizontal plane than the rear drive shaft 32. This carrier axle is mounted beneath the longitudinally positioned frame members 11—11 by vertically positioned supports 42—42. On the under side of the carrier axle 40 there is welded a reinforcing truss 43 for strengthening same. Positioning sleeves 44 surround the carrier axle 40, being welded thereto and each sleeve has a flange 44a thereon. Between the tubular housing 33 and the positioning sleeves 44 there are mounted stabilizing struts 45, which are welded to the tubular housing and to the sleeves. On the outer ends of the carrier axle 40 there are force fitted bearing caps 46.

The positioning sleeves 44 and the bearing caps 46 at each end of the carrier axle 40 support a fabricated hub assembly. This assembly includes bushings 49—49 of bronze, or other suitable bearing metal, which rotatably surround the positioning sleeve 44 and the bearing cap 46, and a hub 53, which is rotatably mounted on the bearing sleeves. At its inner end this hub 53 abuts the flange 44a on the positioning sleeve 44; a retainer plate 47 is secured over the outer end of the hub and held in place by cap bolts 48, which pass freely through suitable holes in the retainer plate and are received in aligned screw threaded holes in the bearing cap 46. The annular space between the carrier axle 40, the hub 53, and the bushings 49—49 is fitted with grease. The grease enters this annular space through a bore 41, which extends from the outer end of the carrier axle lengthwise of same and intersects a radially positioned bore 41a at approximately the middle of the hub 53. An aligned bore is formed in the bearing cap 46 and a hole in the retainer plate 47, and the latter is screw threaded. In this screw threaded hole in the retainer plate there is mounted a conventional "Zerk" type fitting 50, similar to the fitting 89 on the housing of the front differential, as shown in FIGURE 5 and later described.

Adjacent its ends each hub 53 has welded thereto flanges 54—54, which are shouldered at 54a. These pairs of flanges each mount an over size swamp type pneumatic tire 58, which has an inverted V-shaped tread 59 thereon. The sides of the tires 58 are fitted onto the shouldered sections 54a of the flanges 54—54 in much the same manner that the sides of an ordinary automobile tire are fitted onto the rim by stretching the tire bead over the rim. The tire 58 is held in place on one side of the hub 52 by having its inner edge clamped between the bottom flange 39b on the hub 39 and the shouldered section 54a on the flange 54. Cap bolts 55 extend through suitable holes in the flanges 39b and are received in aligned screw threaded holes in the flange 54. Similarly, the tires 58 are held in place on the other sides of the hubs 53 by having their inner edges clamped between annular rings 56 and the shouldered sections 54a on the outer flanges 54 of the hub 53. Cap bolts 55 also extend through suitable holes in the annular ring 56 and are received in aligned screw threaded holes in the outer flange 54 on the hub 53.

The front propeller shaft 26 is rotatably mounted adjacent its forward end in a bearing 60, which latter is mounted for swivel movement on the frame. Parallel plates 61—61 are secured on the opposite sides of the bearing 60. These plates have integral ears 61a at their tops. A forward transversely positioned frame member 62 extends between the parallel longitudinally positioned frame members 11—11 and has a bearing boss 62a at its center. This bearing boss 62a rotatably receives a stub shaft 64, which is threaded at its top at 64a. An internally threaded hold down cap 65 is received on the threaded top 64a of the stub shaft and has its flange bearing against the top of the frame member 62. The stub shaft is rotatably mounted in the bearing boss 62a by upper and lower bushings 63—63. Adjacent its lower end the stub shaft 64 has welded thereto a flange 67 and a thrust bearing 68 surrounds the stub shaft and rests on this flange. A washer 69 may be positioned intermediate the thrust bearing 68 and the bearing boss 62a, if desired. At its lower end the stub shaft 64 is pivotally secured between the ears 61a—61a on the parallel plates by a pin 66. It will thus be seen that the front carrier axle and front drive shaft assembly, to be now described, is pivotally mounted for swinging movement in the horizontal plane, as well as for swinging movement about a vertical axis.

The front carrier axle 70 is made in two sections 70a and 70b, which are secured at their inner ends in any suitable manner in the bearing 60. On the under side of the front carrier axle there is welded a reinforcing truss 73 for strengthening same, in the same manner as the reinforcing truss 43 on the rear carrier axle. At the lower center of the truss 73 there are welded thereto a pair of plates 74 and 76. A stabilizing link 77 extends rearwardly of the frame and is secured at its forward end by a pin 75 to the parallel plates 74 and 76 and at its rear end at any suitable place on the frame.

The front wheels, which are comprised principally by the over-size tires 58—58, are rotatably secured on the respective outer ends of the sections 70a and 70b of the carrier axle in the same manner as the rear wheels on the rear carrier axle 40, as previously described and as illustrated in FIGURES 10 and 11. Adjacent the wheels the axle sections 70a and 70b carry on their outer ends chain gears 78. These driven gears are rotatably mounted in gear casings 79, there being one of these on each side of the frame. The axle sections 70a and 70b are mounted in the inner side walls of the gear casings 79 by positioning sleeves 80, which are similar to the positioning sleeves 44 for the front wheels, previously described.

At its forward end the front propeller shaft 26 is drivably connected by a universal join 27 to a front differential 82, through which there extends a transversely positioned front drive shaft 84. This latter shaft is enclosed by two sections 83a and 83b of a tubular housing, which sections are positioned on the opposite sides of the differential. The housing of the front differential is closed on one side by a removable plate 87, which is secured thereto by cap bolts 88. A conventional "Zerk" type fitting 89 is received in a suitable screw threaded hole in the closure plate 85 and provides for the admission of grease. This fitting is closed at its top by a pipe plug 90. Between the closure plate 87 and the housing of the front differential, there is mounted an intermediate plate 85 which has oppositely disposed sockets 86—86 thereon. These sockets respectively receive the inner ends of the tubular housing sections 83a and 83b; the outer ends of these tubular housing sections are received in collars 91, which have flanges 91a thereon. These collars are secured to the inner side walls of the gear casings 79 by bolts 92, which extend through registering holes in the inner side walls and the flanges 91a on the collars. At its ends the drive shaft 84 has mounted thereon sprockets 93, which are positioned within the gear casings 79. Chains 94 are trained over the sprockets 93 and the driven chain gears 78 for the front wheels.

The front carrier axle sections 70a and 70b are respectively interconnected with the front drive shaft housings 83a and 83b, respectively, into a unitary assembly. As shown in FIGURE 4, angle bars 95 are positioned under the drive shaft housing sections 83a and 83b. Angle plates 97 are cut away along one flange to receive the respective sections 83a or 83b of the front drive shaft housing and are welded to the latter; on their other flanges these angle plates are secured to the angle bars 95 by bolts 96, which pass through registering holes in the parallel flanges of the angle plates 97 and the angle bars 95. The angle bars 95 may be secured to the front carrier axle sections 70a and 70b, respectively, in the same or a similar manner. Also, as shown in FIGURE 3, plates 98 are welded between the front carrier axle sections 70a and 70b and the front drive shaft housings 83a and 83b, respectively.

Steering of the marsh buggy is accomplished by means of a steering wheel 100, which is mounted on a steering column 101 adjacent the driver's seat 17. At the bottom of the steering column there is a conventional worm gear within the worm gear housing 102, which latter is mounted in any conventional manner on the left longitudinally positioned frame member 11. The worm gear actuates a valve in fluid communication with a conventional hydraulic pump mechanism 103, which through conduits 106, 107, 108, and 109 controls oppositely disposed fluid cylinders 110. Conduits 106 and 107 extend to the front cylinder 110 (not shown) on the left side of the vehicle and these conduits are supported by a lug 71 and an eye bolt 72 on the left section of the carrier axle. The fluid cylinders 110 has pistons (not shown) therein and piston rods 111 are connected by universal joints 112 to steering knuckles 113, which in turn are pivotally connected to lugs 99 on the plates 98 between the front carrier axle sections 70a and 70b and the front drive shaft housings 83a and 83b, respectively. Supporting rods 114 are secured axially to the rear ends of the fluid cylinders 110 and are pivotally mounted by universal joints 115 on plates 116. These plates 116 are in turn secured by bolts 117 to vertically positioned plates 118, which are welded to the longitudinally positioned frame members 11—11.

From the foregoing it will now be seen that there is herein provided a novel and effective marsh buggy which is adapted to travel over all sorts of terrain, including swamps, marshes, mud, loose sand and even over water, due to the flotation effect produced by the tires 29 and 49.

It will also be seen that there is herein provided an extremely rigid frame construction, which at the same time permits free swiveling and steering of the front wheels thereof, and which is further characterized by extreme durability and ruggedness. It will also be seen that the marsh buggy hereinbefore shown and described accomplishes all the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

We claim:

In a marsh buggy, the combination of a frame, an internal combustion engine carried thereby, a transmission driven by said engine, said transmission including a driving chain sprocket, a driven chain gear in spaced vertical alignment with said chain sprocket, a chain drivingly connecting said chain sprocket and said chain gear, a driven shaft extending through said chain gear, a front drive shaft, a universal joint connecting one end of said drive shaft to said driven shaft, a bearing assembly swivelably mounted to said frame at the forward end thereof, said bearing assembly including a bearing having a normally disposed longitudinal axis, longitudinally spaced plates secured to opposite sides thereof, an integral ear at the top of each plate and having aligned openings therein, a bearing boss, a vertically disposed stub shaft mounting said bearing boss to said frame, said stub shaft having a flange thereon in spaced parallel relation to said bearing boss, a thrust bearing surrounding said stub shaft and disposed between the flange thereon and said bearing boss, said stub shaft extending between said integral ears on said plates and having an opening therethrough in alignment with the openings in said ears, a pin extending through said aligned openings and having an axis disposed normal to the axis of the stub shaft and parallel to the axis of said bearing, said plates having portions defining openings in alignment with said bearing, a front differential spaced from said bearing assembly, a driven shaft extending from said front differential, through said plates and bearing and rotatably supported thereby, a universal coupling connecting the free end of said front drive shaft to said driven shaft, front drive axles extending transversely from said front differential and having sprockets fixed at the free ends thereof, carrier axles extending transversely from said bearing assembly in spaced parallel relation to said front drive axles, wheels rotatably mounted on the free ends of said carrier axles, sprockets on said wheels in alignment with the sprockets on said front drive axles, chains drivingly connecting said sprockets, a rear carrier axle having wheels at each end thereof, a rear differential having rear drive axles in spaced parallel relation to said carrier axle, said rear drive axles including means to drive said wheels, a rear drive shaft connecting said rear differential to said transmission, said front drive axles and front carrier axles mounted as a unit, and a power steering mechanism driven by said engine connected to said front drive axles-front carrier axles unit to steer said buggy about the axis of said stub shaft.

References Cited in the file of this patent

UNITED STATES PATENTS

| | | |
|---|---|---|
| 844,892 | Pfander | Feb. 19, 1907 |
| 1,294,198 | Timberlake | Feb. 11, 1919 |
| 1,427,362 | Cozzens | Aug. 22, 1922 |
| 1,443,779 | Woodin | Jan. 30, 1923 |
| 2,560,384 | Crain | July 10, 1951 |
| 2,582,142 | Martin | Jan. 8, 1952 |